(12) United States Patent
Flavin et al.

(10) Patent No.: US 6,175,816 B1
(45) Date of Patent: *Jan. 16, 2001

(54) USE OF AUTOMATED TECHNOLOGY IN CHEMICAL PROCESS RESEARCH AND DEVELOPMENT

(75) Inventors: Michael T. Flavin, Darien; Lisa M. Seaney, Glen Ellyn, both of IL (US)

(73) Assignee: Advanced Life Sciences, Inc., Lemont, IL (US)

( * ) Notice: Under 35 U.S.C. 154(b), the term of this patent shall be extended for 0 days.

This patent is subject to a terminal disclaimer.

(21) Appl. No.: 09/443,987

(22) Filed: Nov. 19, 1999

Related U.S. Application Data

(63) Continuation of application No. 08/862,840, filed on May 23, 1997, now Pat. No. 6,044,212
(60) Provisional application No. 60/018,282, filed on May 24, 1996.

(51) Int. Cl.[7] .............................. G06G 7/48; G06G 7/58; G06F 17/50
(52) U.S. Cl. ................................ 703/13; 703/11; 703/12
(58) Field of Search .................................. 703/11, 12, 13

(56) References Cited

U.S. PATENT DOCUMENTS

| | | | |
|---|---|---|---|
| 4,325,910 | 4/1982 | Jordan | 422/64 |
| 5,108,703 | 4/1992 | Pfost et al. | 422/65 |
| 5,239,484 | 8/1993 | Hayashi et al. | 364/500 |
| 5,363,885 | 11/1994 | McConnell et al. | 141/1 |
| 5,428,470 | 6/1995 | Labriola, II | 359/119 |
| 5,443,791 | 8/1995 | Cathcart et al. | 422/65 |
| 5,463,564 | 10/1995 | Agrafiotis et al. | 364/496 |
| 5,499,193 | 3/1996 | Sugawara et al. | 364/500 |
| 5,574,656 | 11/1996 | Agrafiotis et al. | 364/500 |
| 5,609,826 | 3/1997 | Cargill et al. | 422/99 |
| 5,631,844 | 5/1997 | Margrey et al. | 364/496 |
| 5,646,049 | 7/1997 | Tayi | 436/518 |
| 5,684,711 | 11/1997 | Agrafiotis et al. | 364/500 |
| 5,757,659 | 5/1998 | Arai et al. | 364/497 |

OTHER PUBLICATIONS

Frank; "Simultaneous and combinational chemical synthesis techniques for the generation and screening of molecular diversity"; J. Biotech.; vol. 41; pp. 259–272, Jul. 1995.*

Vazquez; "Combinational chemistry synthesis techniques"; IEEE 1997 Proc. Engin. in Medicine and Biology Soc.; pp. 2662–2667, Jul. 1995.*

Borman, S., "Combinatorial Chemists Focus on Small Molecules, Molecular Recognition, and Automation", C & EN, Feb. 12, 1996, pp. 29–54.

Advanced ChemTech, *Advances in Biochemical Production*, vol. 3., Issue 1, pp. 1–3.

J. Lindsey, et al., "Robotic Work Station for Microscale Synthetic Chemistry: On–lin Absorption Spectroscopy, Quantitative Automated Thin–Layer Chromatography, and Multiple Reactions in Parallel", Rev. Sci. Instrum. 59(6), Jun. 1988, pp. 940–950.

* cited by examiner

Primary Examiner—Kevin J. Teska
Assistant Examiner—Hugh Jones
(74) Attorney, Agent, or Firm—McDonnell Boehnen Hulbert & Berghoff

(57) ABSTRACT

A method and workstation for optimizing chemical processes based on combinatorial chemistry, automation technology, and computer-controlled design is disclosed. The workstation includes a synthesizer, an analyzer, a robot and computer in communication with the synthesizer and analyzer. The computer includes one or more programs for regulating reaction parameters such as temperature, pressure, concentration of reagents and employs statistical methods for optimizing multiple reaction parameters and for designing optimized experiments for further investigation.

37 Claims, 11 Drawing Sheets

USE OF AUTOMATED TECHNOLOGY IN CHEMICAL PROCESS RESEARCH AND DEVELOPMENT

RELATED APPLICATIONS

This application claims priority benefits under 35 U.S.C. § 119 based on U.S. Provisional Patent Application Serial No. 60/018,282 filed on May 24, 1996 and is a continuation of U.S. application Ser. No. 08/862,840 filed May 23, 1997, now U.S. Pat. No. 6,044,212.

FIELD OF THE INVENTION

This invention relates to the use of automated technology in chemical process research and development. This technology includes automated synthesis methodology, product structural characterization and purity analysis, and computer-controlled design of experiments (DOE) planning and data interpretation. The invention represents a means by which chemical reaction identification and optimization may be greatly accelerated and more effectively conducted.

BACKGROUND OF THE INVENTION

Chemical process development is an optimization procedure by which conditions are discovered to produce a chemical product efficiently, cost-effectively, safely, and with high quality assurance. Fundamental to this process in the chemical industry is the chemical reaction. The chemical reaction is affected by a wide range of physical variables. Since these variables are interdependent, the possible combinations and permutations of these variables are numerous. As a result, an enormous effort must be undertaken to study the various combinations of variables in order to identify the optimal set of conditions for conducting a given chemical reaction.

The current state of the art in chemical process development involves a manual survey of different reaction conditions, which is time consuming, labor intensive, and repetitive. For example, twelve solvents might be suitable for a given reaction. However, for the individual chemist to set up, work up, and analyze data from more than four experiments at a time becomes a difficult task. As a result, the chemist is limited to running four reactions at a time.

In the interest of expediency, perhaps the chemist can spend one day studying the choice of solvent for the reaction because many more variables must be investigated. Although the data from twelve solvents would be very useful, the chemist only has time to investigate four solvents. This process is then repeated for each of the other reaction variables.

These variables might include concentration, reaction times, temperature, type of reagents, amounts of reagents, etc. Because these variables are dependent upon one another, the number of experiments to be run quickly multiplies. The process becomes very repetitive. The chemist becomes bored and the quality of work is likely to decline. The end result is that only a small percentage of the possible combinations of variables is investigated using the manual approach.

SUMMARY OF THE INVENTION

The use of automated technology in chemical process research and development is disclosed. This technology is applicable to automated synthesis methodology, product structural characterization and purity analysis, and computer-controlled design of experiments (DOE) planning and data interpretation. The invention represents a means by which chemical reaction identification and optimization can be greatly accelerated and more effectively conducted.

BRIEF DESCRIPTION OF THE DRAWINGS

The following discussion will make reference to the accompanying drawing figures, wherein like reference numerals refer to like elements in the various views, and wherein.

DETAILED DESCRIPTION OF THE INVENTION

A. System Overview

In this description, the novel application of automated technology to chemical process development is disclosed. The basic concept is to have a machine perform the repetitive procedures involved in process development in order to increase the efficiency with which data can be collected and analyzed for a given chemical reaction.

Figure 1:
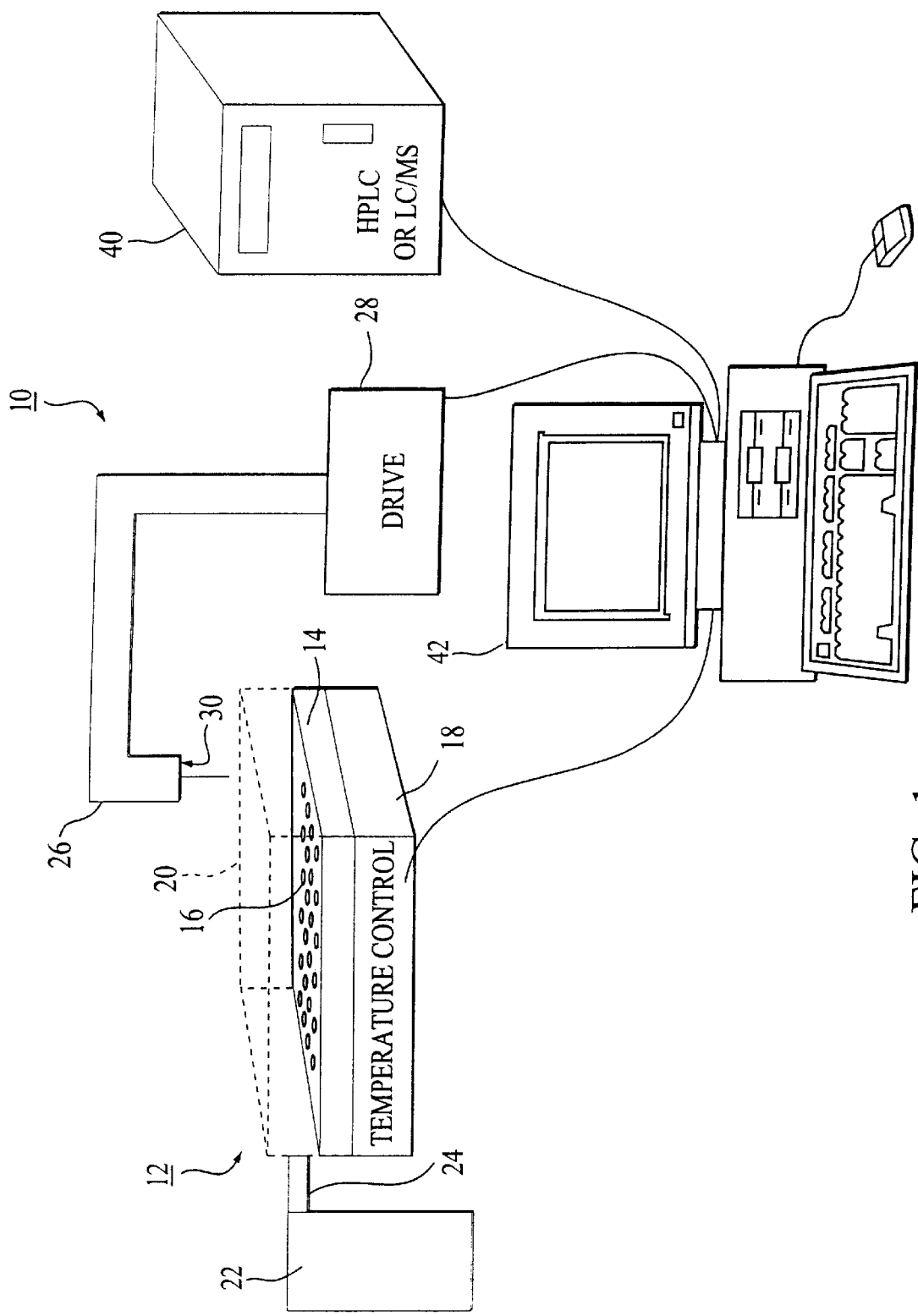
FIG. 1 is a diagram of the components of a preferred workstation for implementing the invention.

A preferred workstation for implementing the invention is shown in FIG. 1. The workstation 10 includes a synthesizer 12 having a reaction block 14 having, for example, 48 reaction wells 16. The synthesizer 12 preferably is equipped with a temperature control system 18 for adjusting the temperature of the block 14, so as to control the temperature of the wells 16. Preferably, the temperature control system 18 has the capability of controlling the temperatures of the wells individually, so that the reaction conditions in the wells 16 can be customized. The synthesizer includes a lid or cover 20. A source 22 of nitrogen or argon gas is connected to the synthesizer 12 via a conduit 24, which enables a control of the atmospheric conditions above the wells. Mixing mechanisms such as a vortex mixer or an orbital shaker can be built into the synthesizer 12 to assist in the mixing of the chemicals in the wells.

The synthesizer 12 further includes a robotic arm assembly 26 which has pipetting capability for selectively adding quantities of one or more reagents to the wells 16. The robotic arm assembly 26 includes an X-Y drive mechanism 28 or other suitable means for controlling the position of the pipetting tip portion 30 of the arm assembly relative to the wells. The pipetting tip portion 30 further includes equipment for quenching the reactions in the wells 16 and for working up the desired reactants. A synthesizer capable of operating experiments is by Bohdam Automation (Mundelein, Ill.) which features the automated synthesis workstation capable of solid-phase and solution-phase synthesis, performing upwards of 48 simultaneous reactions. The reactions can run in an atmosphere and solvent of choice by the operator at temperatures ranging from −40° C. to +150° C.

The station 10 also includes an analytical instrument 40 such as an HPLC or LC/MS for conducting analysis of the products of such chemical reaction. The reaction products from the synthesizer 12 can be either manually loaded into the analytical instrument 40, or loaded automatically with the assistance of suitable robotic arms or other equipment, represented by robot 50 in FIG. 2 or other suitable mechanical system.

Figure 2:
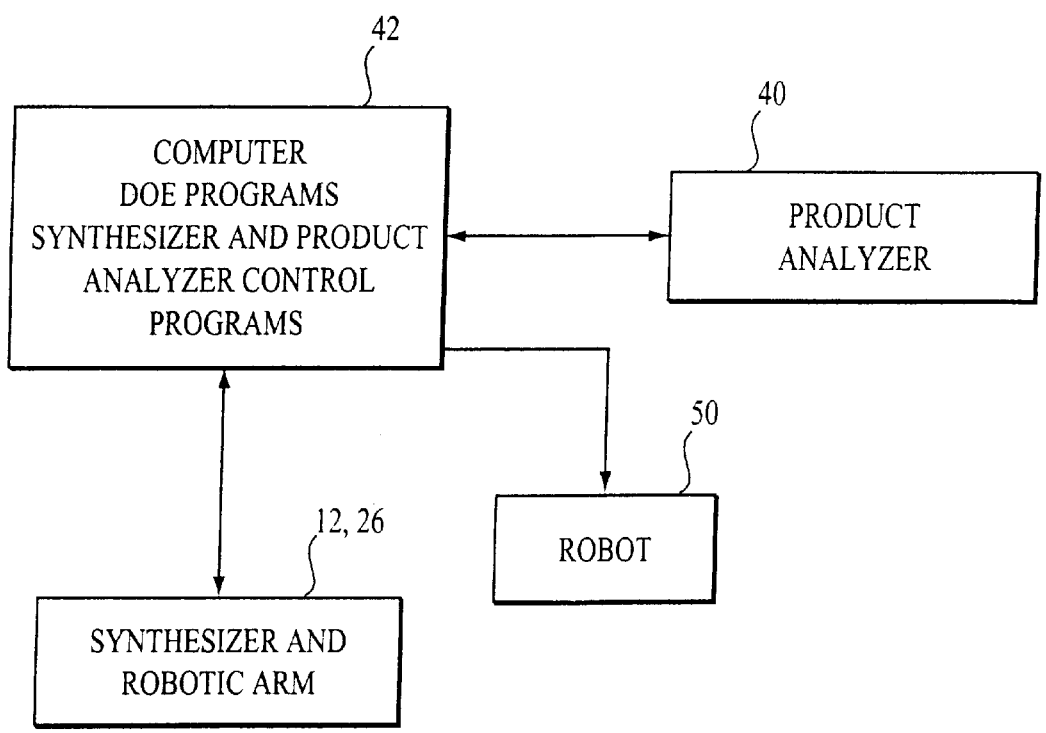
FIG. 2 is a block diagram illustrating the flow of commands and data between the computer and synthesizer, robotic arm and product analyzer of FIG. 1.

The operation of the synthesizer 12 and analytical instrument 40 is controlled by a computer 42, as shown in the block diagram of FIG. 2. The computer 42 regulates the environmental conditions in the synthesizer 12 such as by controlling the temperature of the wells 16. The quantity and type of reagents added to the wells is also controlled by the computer 42, as is the position of the arm 26 relative to the wells 16. The computer 42 further initiates and controls the analysis of the chemical reaction products in the analytical instrument 40, and receives the analytical data from the instrument 40. The computer 42 further implements a design of experiment program (DOE) that is used to identify the optimal conditions for the chemical reaction being studied, as described below. It will be understood that some or all of the control functions of the computer 42 may be integrated into one or more of the individual components of the system 10. Where the reaction products are automatically loaded into the product analyzer 40, the computer 42 controls a robot 50 to perform this task.

Figure 4:
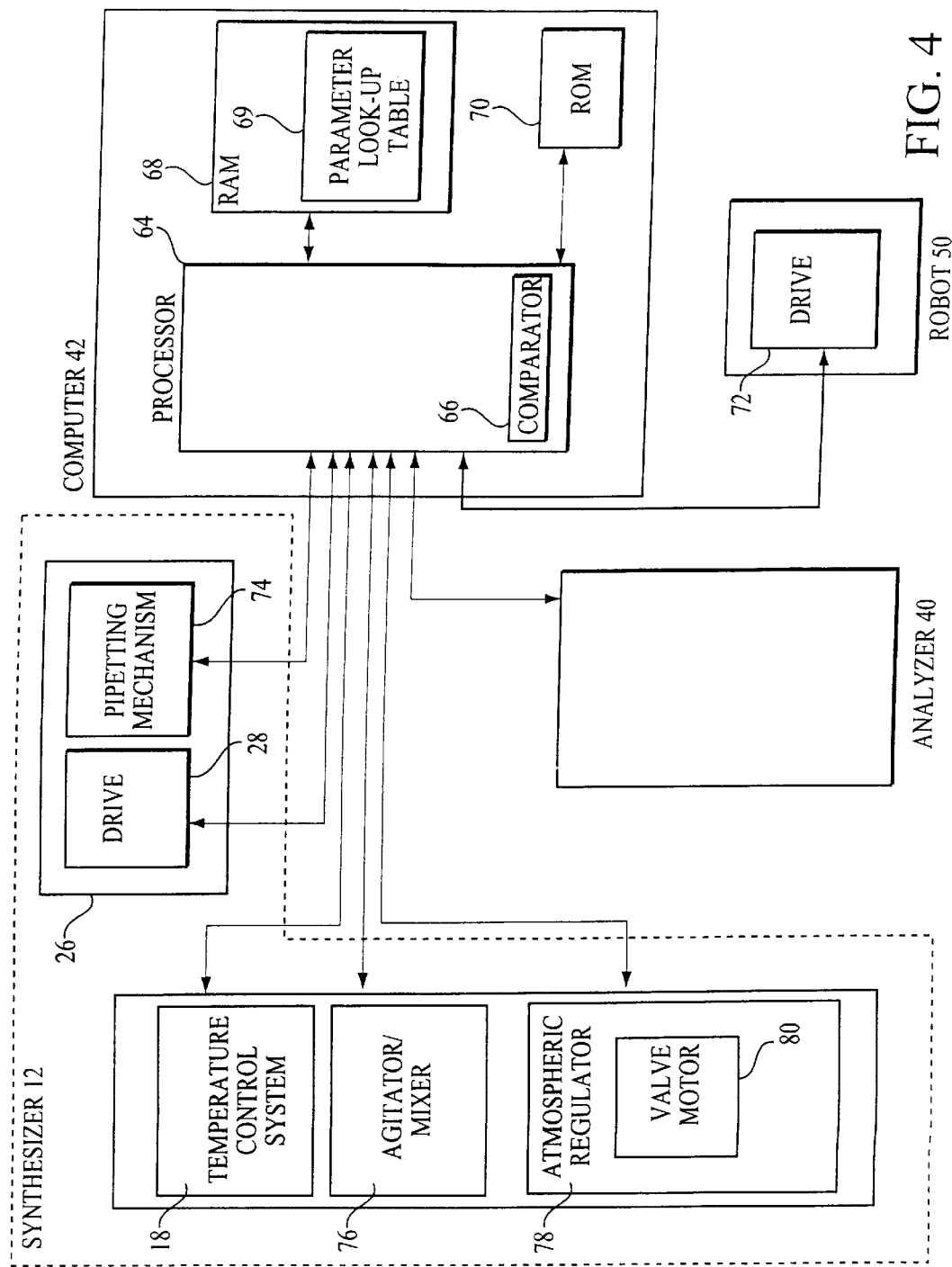
FIG. 4 is an additional block diagram of the computer, synthesizer, robot, and analyzer.
Figure 5A:
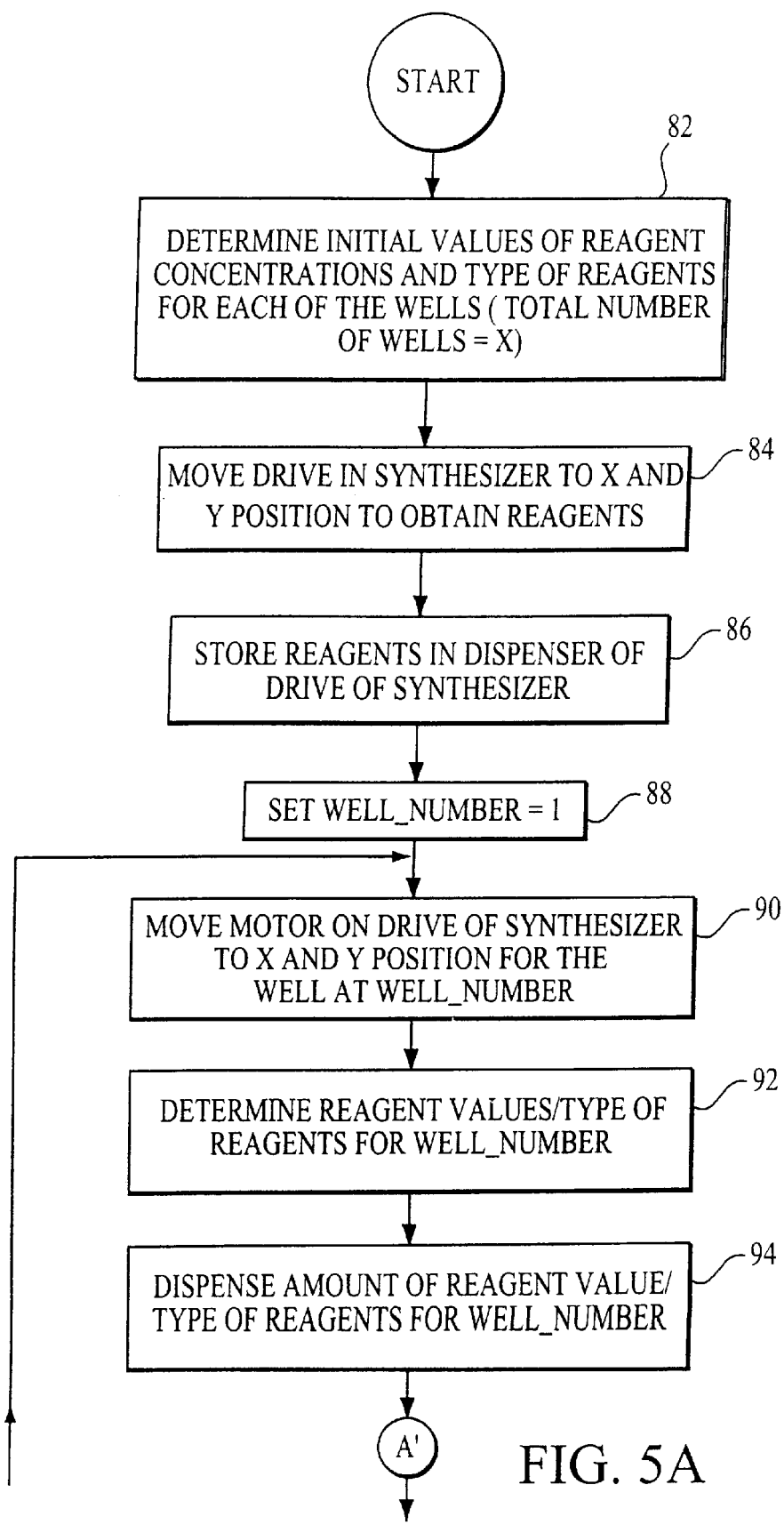
FIGS. 5A–5G are an additional flow chart of the sequence of steps in performing the preferred chemical reaction optimization routine using the equipment of FIG. 1.
Figure 5B:
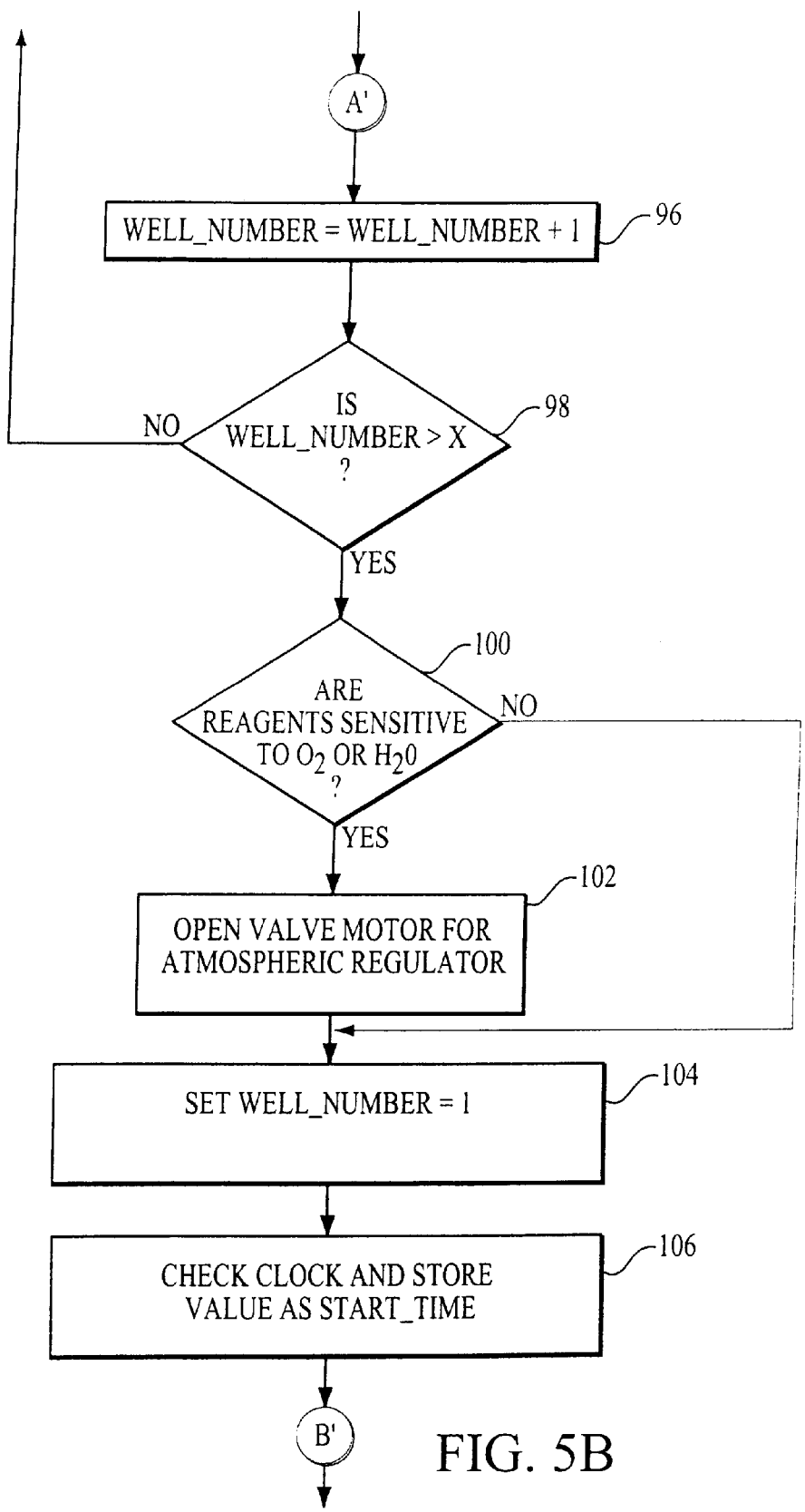
Figure 5C:
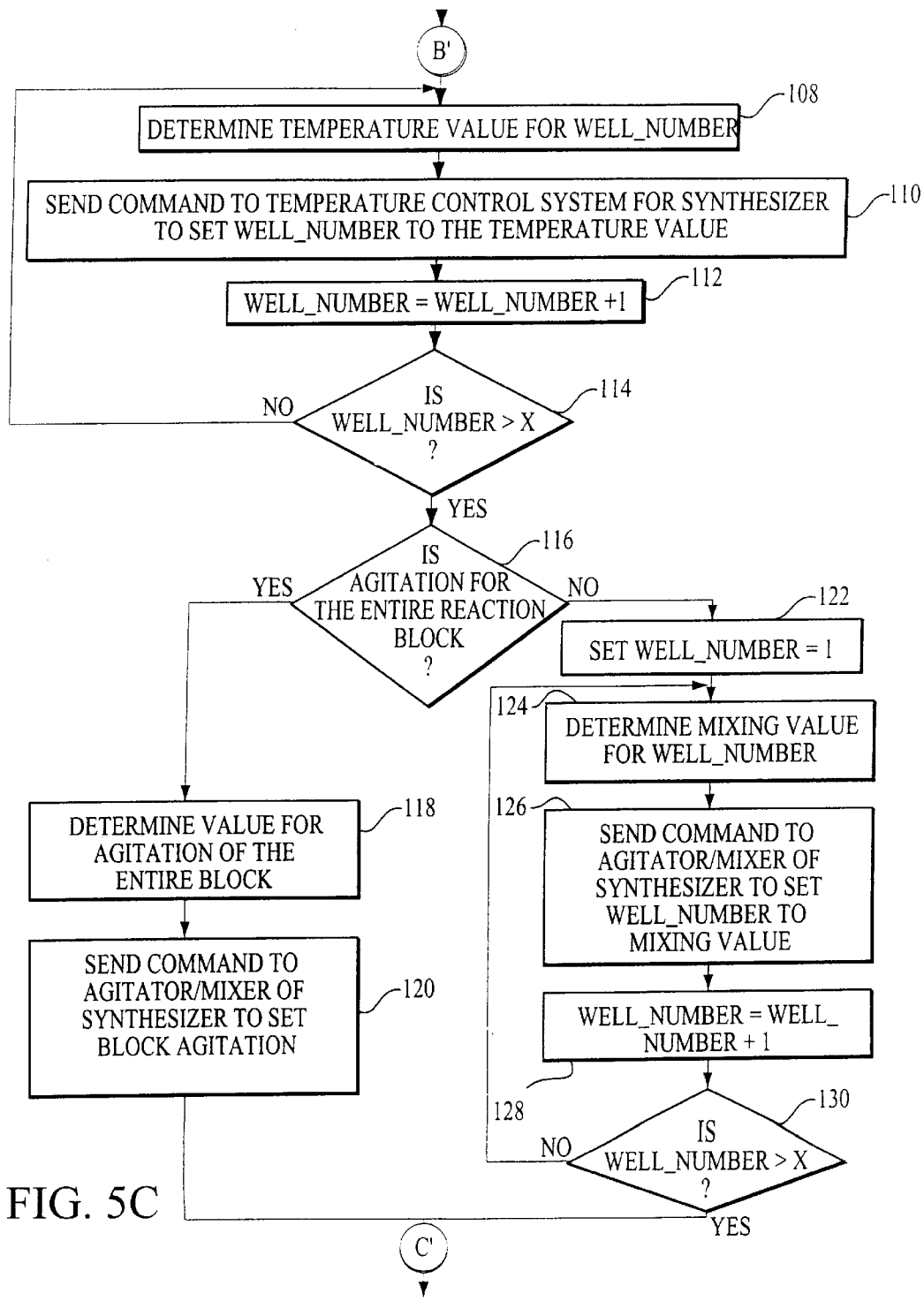
Figure 5D:
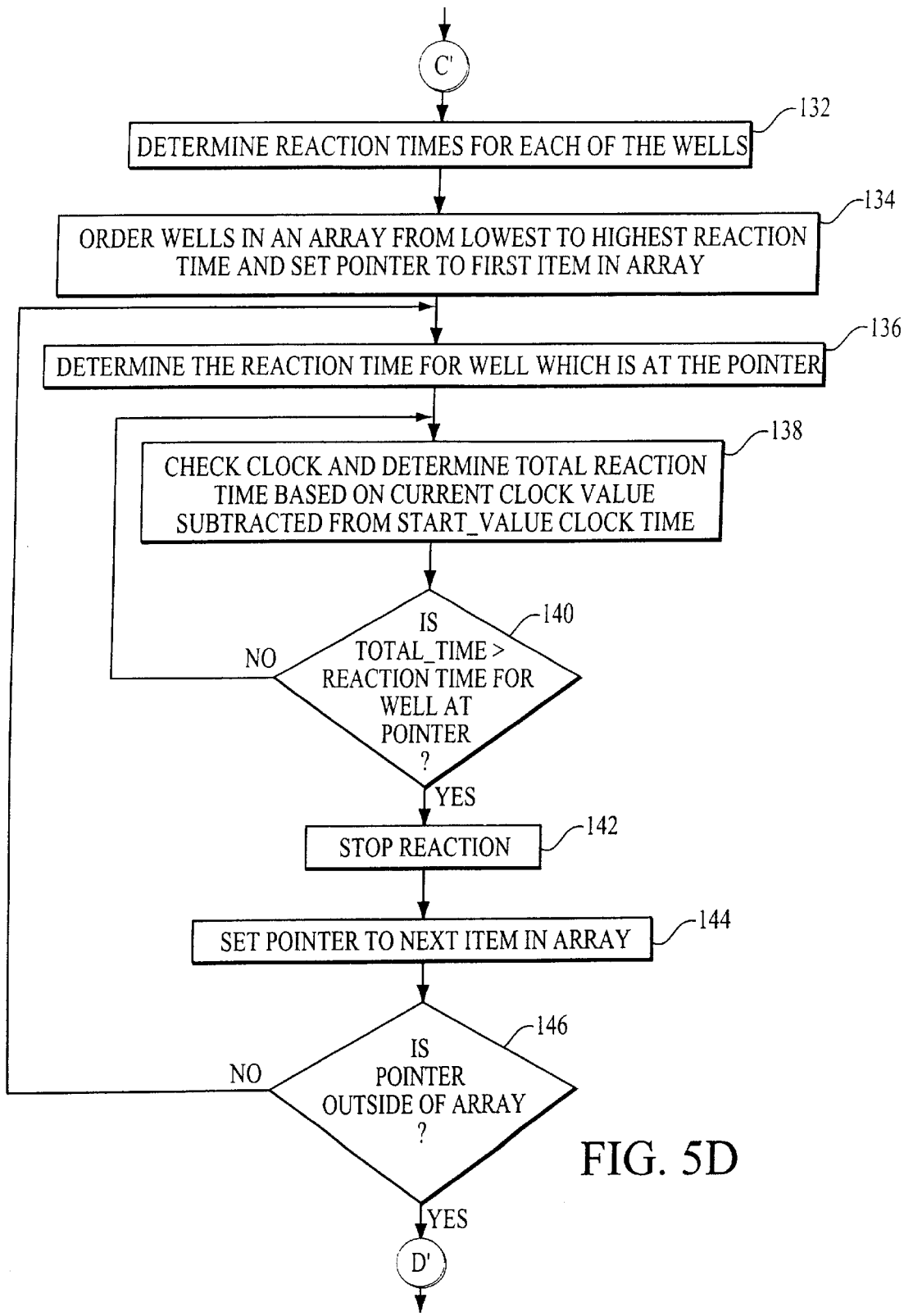
Figure 5E:
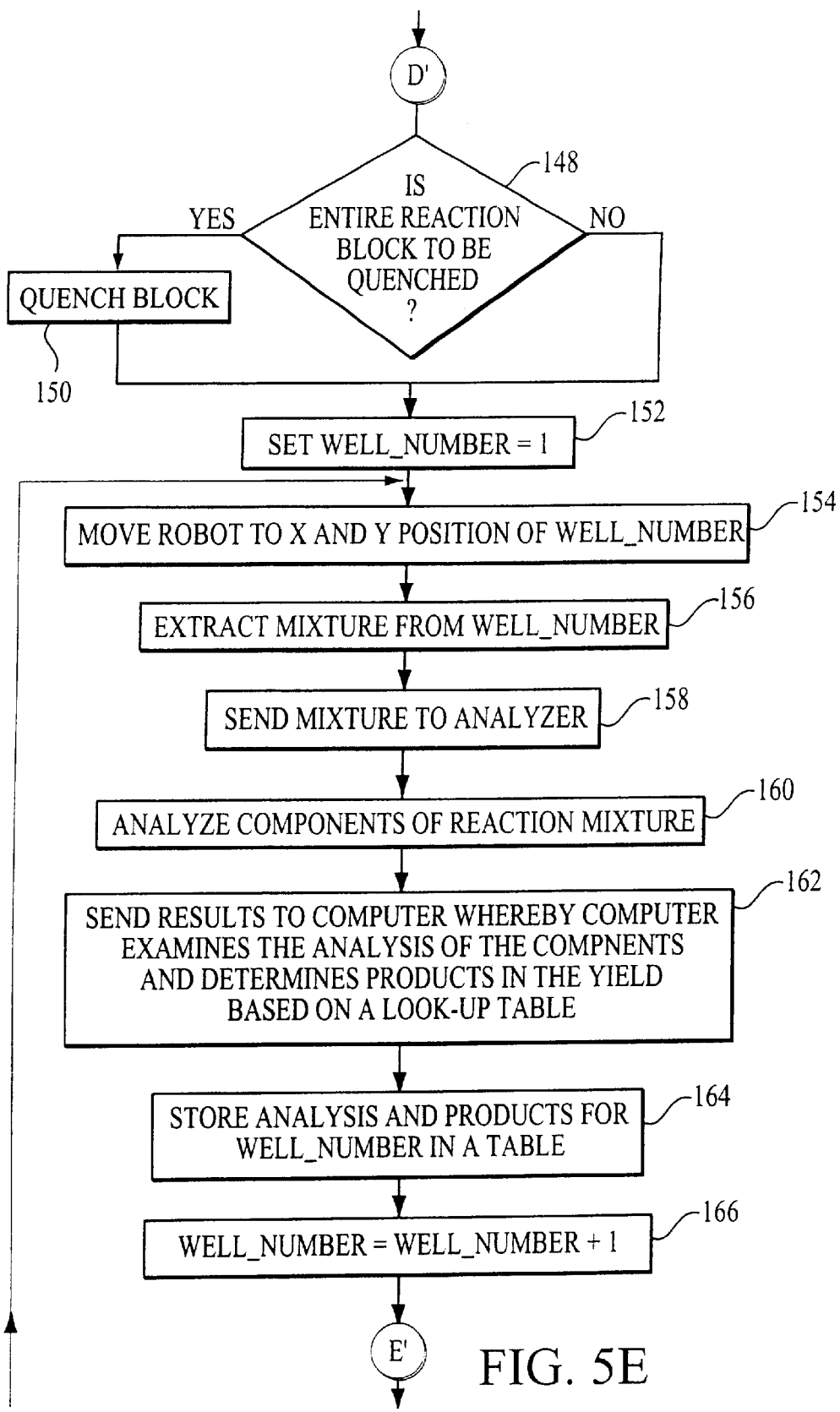
Figure 5F:
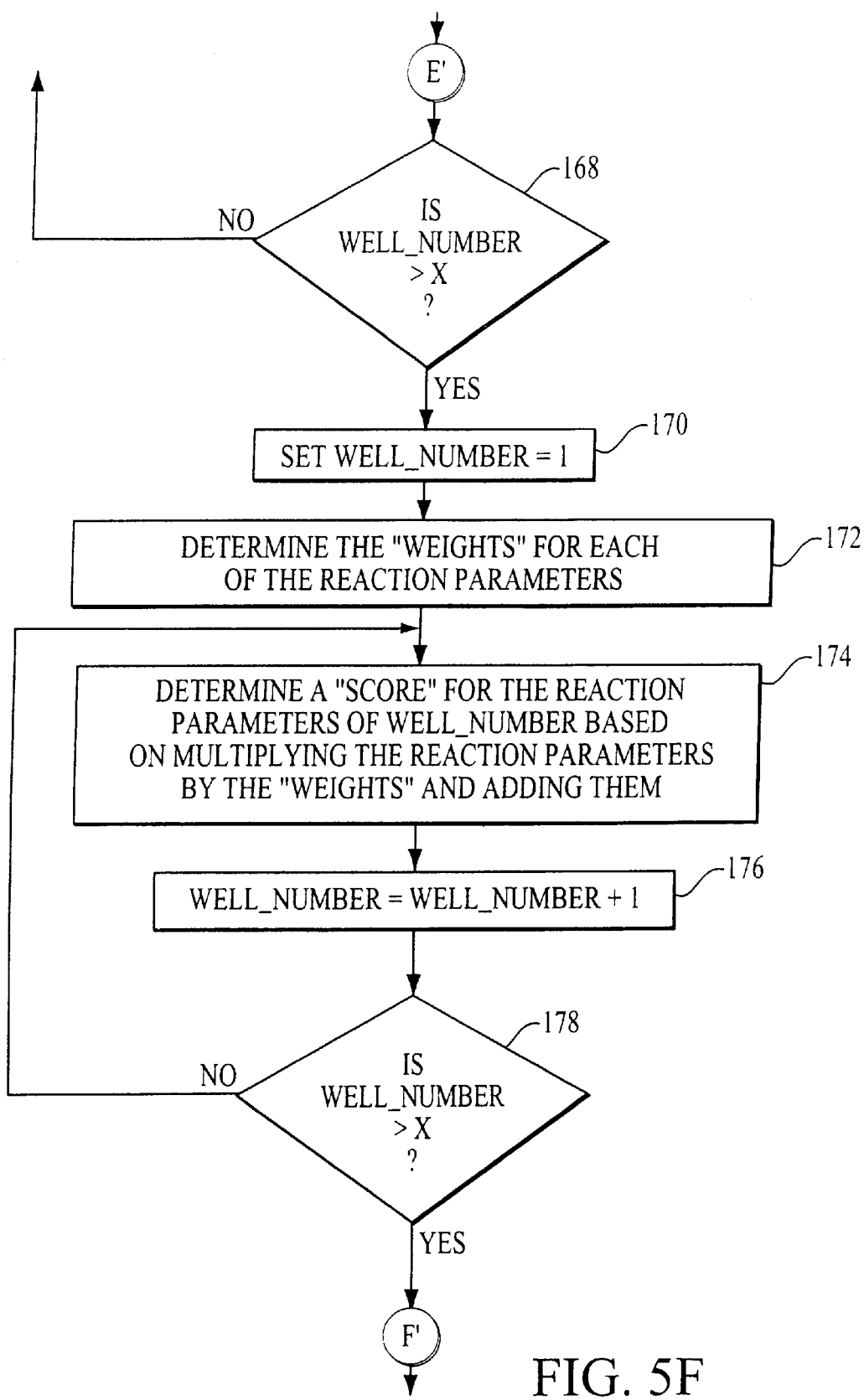
Figure 5G:
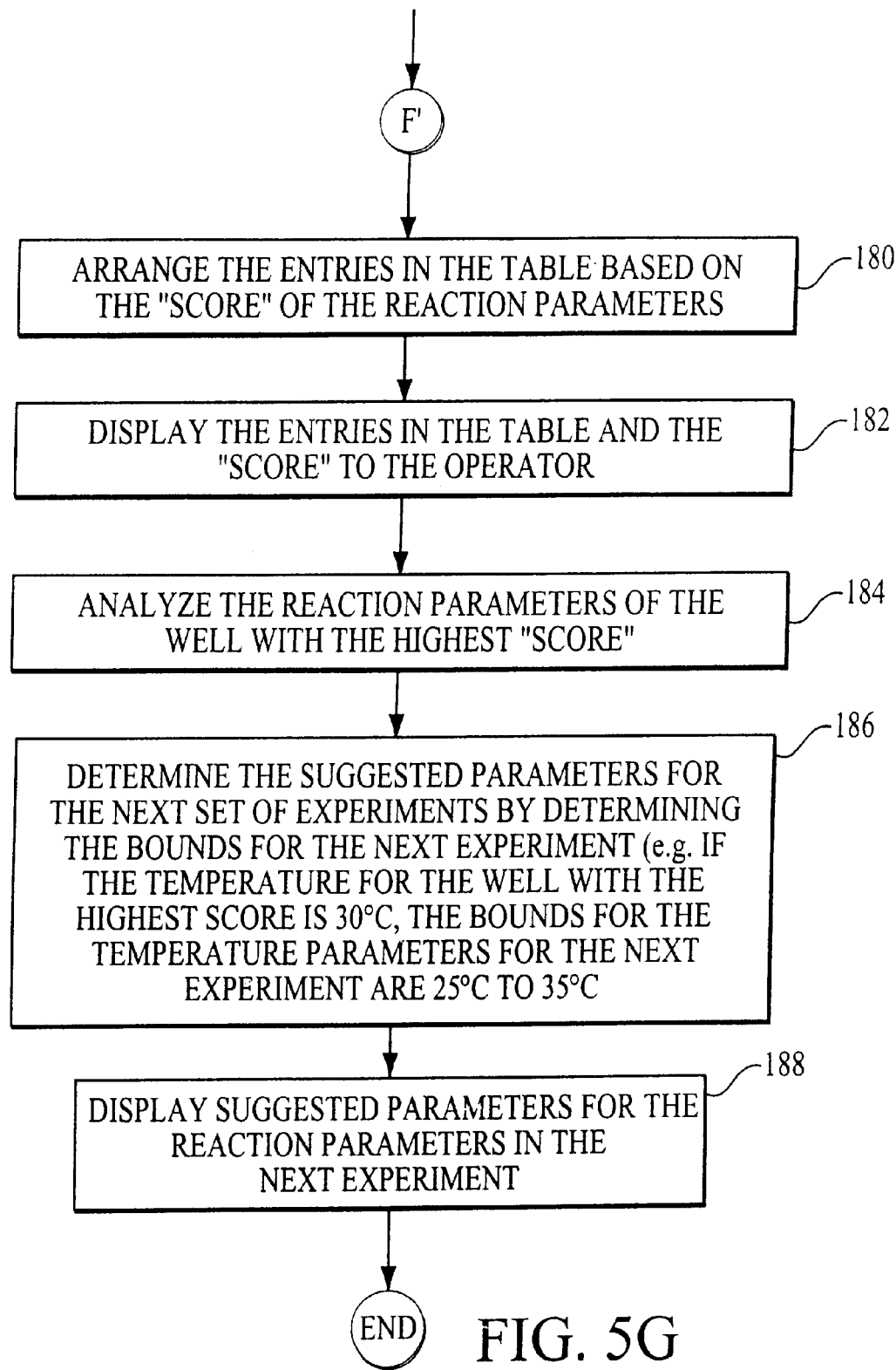

An additional block diagram of the computer, synthesizer, robot, and analyzer is shown in FIG. 4. The computer 42 contains a processor 64 which communicates with non-volatile (read only memory, ROM 68) and volatile (random access memory, RAM 70) memory devices. The processor 64 also has a comparator 66 for comparing values. The processor 64 executes a computer program, as described subsequently in FIG. 5. The computer program is stored in the ROM 70 and executedeither in the RAM 68 or the ROM 70.

The processor 64 communicates with various subcomponents of the synthesizer 12, the analyzer 40 and the robot 50. The synthesizer contains a temperature control system 18 which controls the temperature of each of the individual wells of the block. The processor sends a command to the temperature control system 18 specifying a certain temperature for a particular well. The synthesizer also contains an agitator/mixer 76 which agitates or mixes the individual wells. There are two different methods of agitating or mixing. The first method is to agitate the block as a whole whereby each of the wells are shaken at the same rate. To do this, the entire reaction block is agitated at one rate. The second method is to mix each of the individual wells at different rates. Each well is equipped with at metal stirrer underneath the well. Inside the well is a TEFLON-coated magnet which follows the motion of the metal stirrer underneath the well. In this manner, the individual well is stirred based on the rate at which the metal stirrer is rotated. The rate of rotation is set by the processor 64.

The synthesizer also contains an atmospheric regulator 78 which protects the reactants in the wells if the reactants are sensitive to oxygen or water or other materials in the environment in proximity to the well. Nitrogen or argon gas is dispensed from the source 22 through the conduit 24 based on a valve which is controlled by the valve motor 80. The valve motor is controlled by the processor 64.

The synthesizer further contains a drive 28 for moving the robotic arm assembly 26. As described above, the robotic arm assembly 26 has pipetting capability for selecting, obtaining and dispensing one or more reagents. The pipetting capability is performed through a pipetting mechanism 74 which draws reagents through the pipetting tip portion 30 and stores one or more reagents in the robotic arm assembly 26. Subsequently, the one or more reagents are dispensed via the pipetting mechanism 74 into the wells. Both the drive 28 and the pipetting mechanism 74 are controlled by the processor 64.

The analyzer 40 and robot 50 are in communication with the processor 64 as well. The processor 64 controls the drive 72 of the robot 50 which extracts samples from each of the wells. The samples are transferred to the analyzer 40 which analyzes the contents of the sample such as the components of the reaction mixture including the product, the reactants, and any contaminants.

B. Methodology

Where the number of reagents is in the hundreds, hundreds of thousands of different compounds are possible. The practical consequence is that expanding the numbers of compounds under evaluation increases the probability of discovering a molecule with the desired biological properties. Testing of combinations of compounds is done, with further testing performed based on interpretation of the results of the prior tests. In this manner, optimization of the reaction is used in synthesizing the desired product through an iterative process of running tests, interpreting the tests and generating new parameters of testing for future tests based on the analysis of the current tests.

Automated process development is distinctly advantageous over manual surveys of process conditions. The automated process is capable of executing signficantly more tests at one time with less operator input. Further, the automated process development assists the operator by analyzing the test results and suggesting parameters for further testing. Optimal conditions are defined by the operator for the particular test. Ordinarily, conditions of interest to an operator include: amount of yield; amount of by-products; amount of unreacted reagents; temperature and time of reaction.

A preferred automatic chemical process development technique according to the present invention is shown in flow-chart form in FIG. 3, and will be described in conjunction with the system shown in FIG. 1. In Steps 1–3, the synthesizer 12 containing a 48-well reaction block 14 is used for the reaction of interest, and the robotic arm 26 can be programmed to dispense precise amounts of reagents into each well (see FIG. 1). Each well 16 contains a separate experiment. The temperature within each well can be controlled and the contents of each well can be efficiently mixed. As an example of one possible study, with a 48-well reaction block 14, twelve different solvent systems at four different concentrations can be investigated. The 48 reactions are then run simultaneously in the time that only four reactions could be run in a manual approach. The reactions can then be quenched and worked up using the same robotic technology. This process alleviates the chemist from performing repetitive tasks and increases the efficiency with which information can be gathered.

Figure 3:
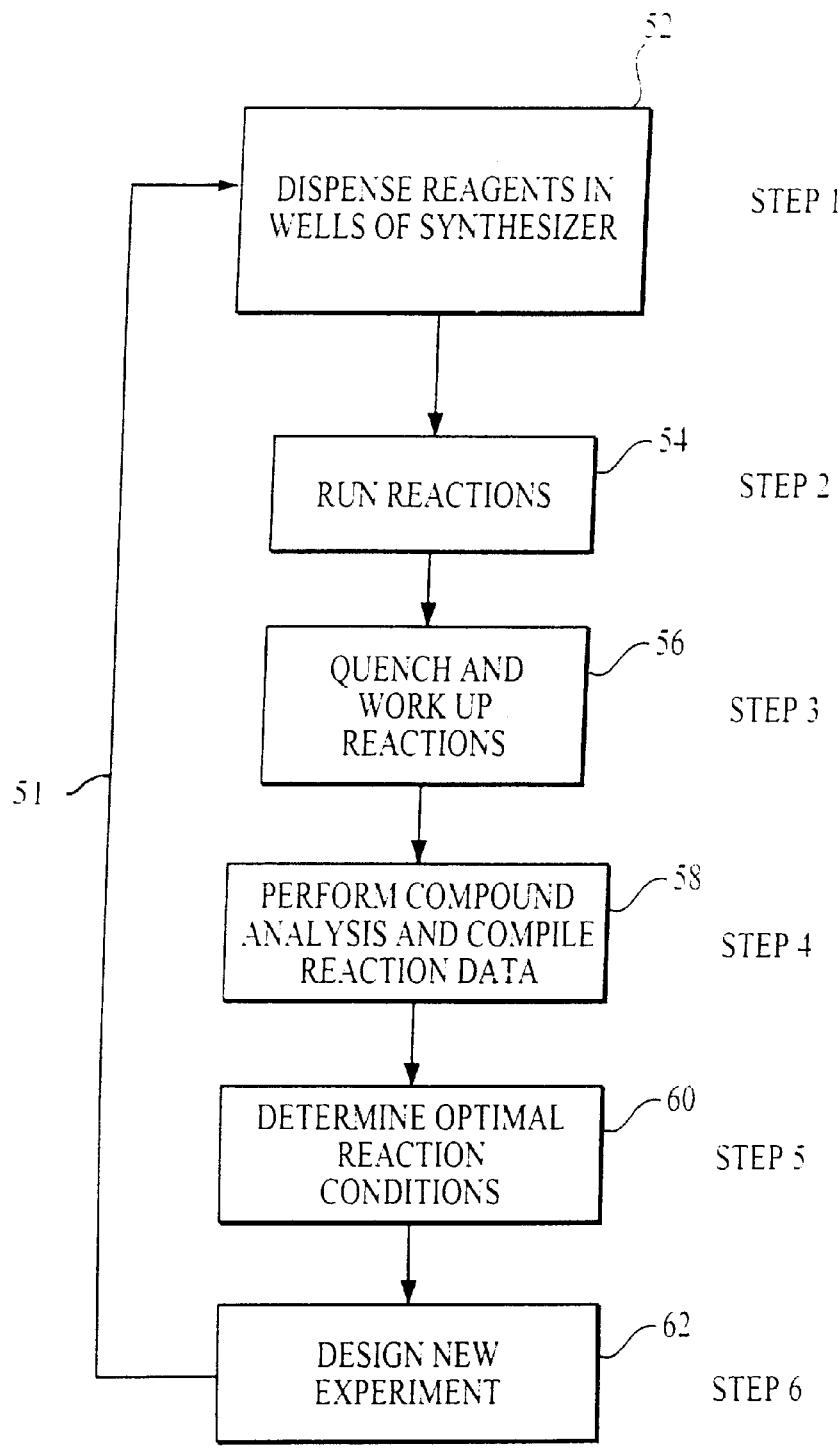
FIG. 3 is flow chart illustrating the sequence of steps in performing the preferred chemical reaction optimization routine using the equipment of FIG. 1.

Once the 48 reactions are completed, at step 4, as shown at block 58 of FIG. 3, the tasks of compound analysis and data compilation begin. These processes can also be automated. The success of each of these 48 reactions can be evaluated using the analytical technique which was already developed for the parent reaction. For example, HPLC might be the analytical method of choice. In this case, the crude product mixtures would be manually or automatically transferred to vials which fit in an HPLC autosampler 40. Analysis of each reaction mixture would be completed automatically and the results would be compiled and analyzed by the computer 42. This computer 42 also controls the synthesizer 12 and the HPLC unit 40.

At this point (step 5), the chemist would determine how to interpret the experimental data. If product yield is the primary concern, this can be calculated by quantitative analysis from HPLC data. Alternatively, the chemist may be interested in the reaction conditions which minimize a particular side product or may want to determine the chemical structure of a new side product. In the latter case, LC/MS would be useful to gain additional information about the new side product. LC/MS would be an alternative analytical method to HPLC.

The concept of statistical design of experiments (DOE) may be applied to aid in experimental design (step 6). Commercially available computer programs can, in fact, control the reaction conditions utilized by the synthesizer to conduct the most effective DOE study. The computer 42 can then correlate the data obtained on reaction yield, product purity, etc. and extrapolate to propose, and subsequently confirm, optimal reaction conditions. This is represented by the arrow 51 in FIG. 3. Basically, a new and more narrowly circumscribed set of reaction conditions are programmed in the synthesizer and robotic arm, and the process is repeated. This procedure could iterate several times, until the optimal reaction conditions are determined with the desired level of precision. Alternatively, the procedure (steps 1–5) could just be performed once, with the computer 42 identifying which of the reaction wells 16 had the most favorable conditions for the reaction.

FIGS. 5A–5G are an additional flow chart of the sequence of steps in performing the preferred chemical reaction optimization routine. The program which executes the operation of the automated sequence of operations, as stated above, is resident either in RAM 68 or ROM 70. The program first determines the initial values of reagent concentrations and type of reagents for each of the wells 82. This is done so that the processor 64 can command the pipetting mechanism 74 to obtain the correct reagents and the approximate amount of reagents for use in all of the wells. As shown in FIGS. 5A–5G, the total number of wells is designated as "X." As discussed above, one reaction block 14 has, for example, 48 reaction wells 16. Reaction blocks with less or more reaction wells may be used as well.

The processor 64 then instructs the drive 28 to a particular x and y position to obtain the reagents 84. The pipetting mechanism 74 then stores the reagents in the dispenser of the drive of the synthesizer 12, as shown at block 86 of FIG. 5. Then a loop is executed for each of the wells 16, with the_well number set equal to 1, as shown at block 88 of FIG. 5. The processor 64 moves the motor of the drive 28 to the x and y position of the well 90, the reagent values and type of reagents is determined by the processor 92, and the reagents are dispensed into the well, as shown at block 94 of FIG. 5. The reagent values and type of reagents is determined by a parameter look-up table 69 (which contains all of the relevant parameters for the experiment) in the memory of the microprocessor. The reagent values and type of reagents is either based on operator input or based on the optimization scheme described subsequently. The well_ number is incremented by 1, as shown at block 96 of FIG. 5. If the well_number is greater than the total number of wells (X), then the loop is exited, as shown at block 98 of FIG. 5. Otherwise, the flow chart of FIG. 5 goes to block 90.

Alternatively, the pipetting mechanism, rather than storing the reagents in the dispenser in one step and dispensing in another step may alternatively store the reagents and dispense, sequentially for each well. Further, rather than automatic obtaining and dispensing of the reagents, the operator may manually input the reagent values into the wells.

Prior to execution of the program, a reagent-properties look-up table is created which determines, for a specific reagent, whether the reagent is sensitive to oxygen or water. This reagent-properties look-up table may be separate and distinct from the parameter look-up table 69, or may be combined for operator convenience. Based on the reagent-properties look-up table, if the reagent is sensitive to oxygen or water 100, the processor 64 opens the valve motor 80 to dispense either nitrogen or argon gas as shown at block 102 of FIG. 5. The well_number is set equal to 1, as shown at block 104 of FIG. 5. Then, the clock for the processor 64 is checked with the value stored as the start_time of the experiment 106. A loop is then entered to set the temperatures of each of the wells. The temperature is determined for each well 108 by the parameter look-up table 69. The temperature in the parameter look-up table 69 is either based on operator input or based on the optimization scheme described subsequently. The processor 64 sends a command to the temperature control system 18 to set the temperature value 110. The well_number is incremented by 1, as shown at block 112 of FIG. 5. If the well_number is greater than the total number of wells (X), then the loop is exited, as shown at block 114 of FIG. 5. Otherwise, the flow chart of FIG. 5 goes to block 108.

The agitation/mixing of the synthesizer is next initialized based on whether the individual wells are mixed at different rates or whether the entire reaction block is agitated at the same rate, as shown at block 116 of FIG. 5. If the agitation is at the same rate, the program determines the block agitation from the parameter look-up table 118 and sends a command to the agitator/mixer 120. If the agitation is at different rates, the program enters a loop, with the well_ number set equal to 1 as shown at block 122 of FIG. 5, and determines the agitation from the parameter look-up table for each well 124 and sends a command to the agitator/mixer 126. The well_number is incremented by 1, as shown at block 128 of FIG. 5. If the well_number is greater than the total number of wells (X), then the loop is exited, as shown at block 130 of FIG. 5. Otherwise, the flow chart of FIG. 5 goes to block 124.

The reaction times are then determined for each of the wells, as shown at block 132 of FIG. 5 based on data in the parameter look-up table 69. The wells are ordered in an array based on the reaction time, from lowest to highest with a pointer set to the first item in the array, as shown at block 134 of FIG. 5. The reaction time is determined for the well which is at the pointer, as shown at block 136. The reaction times are then checked based on checking the clock from the processor 64 and subtracting the time from the start value 138. When the reaction time has been exceeded for a particular well, as shown at block 140, the reaction is stopped 142. Stopping the reaction can be done in several ways depending upon the particular reaction. The heat may be removed, the agitation stopped, or some other material, such as water, an acid or a base, may be added to stop the reaction. The pointer is set to the next item in the array, as shown at block 144. As shown at block 146, if the pointer is outside of the array, the flow chart goes to block 148. Otherwise, the flow chart goes to block 136. Then, based on the parameter look-up table 69, the processor determines whether to quench the entire reaction block 148. If yes, the block is quenched, as shown at block 150.

After the reaction, the components of each of the wells 16 must be removed from each of the wells, sent to the analyzer 40 and analyzed. The well_number is set equal to 1, as shown at block 152 of FIG. 5. The processor 64 signals the drive 72 of the robot 50 to move to an x and y position 154, extract mixture from the well 156, and send the mixture to the analyzer 158. The analyzer 40 then analyzes the components of the reaction mixture, as shown at block 160, and sends the results to the processor 64. The processor 64 examines the data from the analyzer 40 and, based on a product table, determines the products of the yield in each of the wells, as shown at block 162. This product table is input prior to operation of the program with each of the values which may be sent from the analyzer having a corresponding type of product based on that value. Some analyzers perform this look-up table function itself and send the list of products back to the processor. The processor stores the analysis in a newly-created table, as shown at block 164, and continues obtaining data for each of the wells. The well_number is incremented by 1, as shown at block 166 of FIG. 5. If the well_number is greater than the total number of wells (X), then the loop is exited, as shown at block 168 of FIG. 5. Otherwise, the flow chart of FIG. 5 goes to block 154.

The newly created table is then analyzed by the processor 64 in order to determine the suggested parameters for the next experiment.

The initial reaction parameters such as temperature, time, concentration and/or pressure and the yield data obtained by the analyzer for each of the initial experiments are then entered into the program. The program then processes the data, generates multivariable contour maps or response surfaces which describe the behavior of the system of reaction parameters or variables, and designs a set of new experiments based on the response surfaces. Methods for studying relationships among multiple parameters and for solving statistical problems related to these relationships are known and include the Monte Carlo method and rotating-simplex method of optimization, otherwise known as the self-directing optimization (SDO) method. A general discussion of the useful statistical methods for solving statistical problems is included in C. Hendrix (1980) *Chemtech*, August 1980, pp. 488–96 which is incorporated by reference in its entirety. It will be understood by the ordinary skilled artisan that the program may include one or more suitable statistical methods for optimization of processes having multiple parameters and for designing experiments which include multiple variables.

Using a program which utilizes the Monte Carlo method, for instance, the operator can define the space of parameters to be analyzed, run a series of random preliminary experiments in this space, define a new space of parameters using the best of these preliminary experiments, run additional experiments in the new space and continue this process until no further improvement is observed. For example, the operator defines a space of reaction parameters for each experiment such as reaction temperature, concentration of reagent(s), pressure, and time period then performs several preliminary random experiments using the synthesizer. The analyzer data concerning reaction product yield, for instance, are then stored in the computer as a parameter. Based on the preliminary parameters and the product yield parameter, the program then utilizes the statistical method to generate a new space of parameters (e.g., reaction temperature, concentration, pressure and time) for further experimentation. A new set of reactions are then performed with the new space of parameters and the result product yield parameter is then stored and processed by the Monte Carlo method as before. This process can be repeated until no further improvements in reaction product yield, for instance, are obtained.

Alternatively, a program which utilizes the SDO method generates a set of experiments in all of the variables of interest for the operator. When these experiment has been run, the experiment that gave the worst result is identified among the set. This experiment is then discarded and replaced with a new experiment. When the replacement experiment has been run, the worst of the set is again identified and discarded. This process continues until no further improvement is observed. For example, the operator performs preliminary experiments with the synthesizer using SDO variables of interest. The reaction yield data, in combination with the variables, are then analyzed by the program. The program would then eliminate the experiment with the worst result, e.g., worst yield, and generate a new proposed experiment. This process is repeated until no further improvements in product yield, for instance, are obtained.

Another method to analyze the data in the newly created table is by first determining the "weights" for each of the reaction parameters 172. The reaction parameters include the total product yield, the amount of contaminants, the amount of unreacted reagents, the time of the reaction, the temperature of the reaction and the agitation/mixing of the reaction. Prior to execution of the program, the operator assigns "weights" based on importance of each reaction parameter. In this manner, the results of each of the wells can be assigned a total "score" by multiplying the reaction parameters by the "weights" and adding them. For example, if the total product yield and the total time are the two parameters of interest, and the total product yield is considered more important than the time of the reaction, the "weights" for each can be 0.8 and 0.2, respectively for each of the two parameters. Each of the results for an individual well can then be tallied 174. The well_number is set to 1, as shown at block 170. The well_number is incremented by 1, as shown at block 176 of FIG. 5. If the well_number is greater than the total number of wells (X), then the loop is exited, as shown at block 178 of FIG. 5. Otherwise, the flow chart of FIG. 5 goes to block 174. For parameters which are more desirable when they are lower in value, e.g. the time of reaction, the result of multiplying the weight by the parameter can be inverted, and then added to the total to determine the "score."

The entries can then be arranged based on the score 180. The processor 64 then displays the results of the raw data and the "scores" 182. At each step in the methodology, the display can be updated to inform the operator of the current reaction. For example, when the processor 64 commands or receives information from the synthesizer 12, the analyzer 40 or the robot 50, the display can be updated to indicate the current operation.

Based on the highest ranked "score," the suggested bounds for the next set of experiments are determined 184, 186. For example, if the temperature of the reaction is determined to be an important parameter, the temperature value of the highest ranked "score" is used as a base value for the temperature bounds for the next set of experiments. The suggested parameters is then displayed to the operator 188.

This automated process development technology allows a vast array of data to be collected and interpreted. Many combinations of reaction variables can be investigated in a short time period. Using the current manual technology, only a local optimization is found because it is too time consuming to investigate every set of reaction conditions. With the new automated technology presented here, a large number of statistical data points can be collected. In essence, a global optimization is found. The amount of data generated by this process is limited only by the number of variables that can be envisioned for a given reaction.

Some components of the automated technology discussed in this disclosure have found application in combinatorial chemistry for the area of drug discovery. As a result, robotic technology and automated synthesizers, as well as HPLC and LC/MS instruments are commercially available. The novel integration and application of these methods to chemical process research and development, however, has not been pursued to the best of our knowledge.

The hardware elements of the workstation of FIG. 1 are generally known in the art and either commercially available or described in the literature. See, for example, U.S. Pat. Nos. 5,443,791 and 5,463,564 which are incorporated by reference herein. A suitable synthesizer is available from Advanced ChemTech of Louisville, Ky., model no. 4906 MOS and from Bohdan Automation, Inc. of Mundelein, Ill. RAM® synthesizer. Robotic arm 26 mechanisms are incorporated into the automated synthesizer equipment of Advanced Chemtech and Bohdan Automation. Suitable HPLC and LC/MS analytical instruments equipped with autosamplers are widely available. The synthesizer, robotic arm, and analytical instruments typically come with their own resident computer software, which can be readily modified or augmented by persons of skill in the art to accomplish the chemical process and design of experimentation methodology described herein. A suitable analytical instrument capable of ascertaining purity and structure is the Finnigan MAT (San Jose, Calif.) liquid chromatograph/mass spectrometer (LC/MS/MS).

What is claimed is:

1. A method for chemical synthesis using a synthesizer, an analyzer, and a computer, the method including the steps of:
    identifying variables which affect chemical synthesis for a reaction;
    determining a range of values of the variables;
    choosing a finite number of experimental tests, wherein the experimental tests have values for the variables chosen from the range of values;
    providing a plurality of wells;
    assigning each of the experimental tests to a particular well;
    dispensing reagents into a plurality of wells chosen from the values for the experimental tests;
    reacting in the synthesizer the reagents using operating conditions chosen from the values for the experimental tests;
    obtaining samples from the plurality of wells;
    analyzing the samples using the analyzer to determine amounts of at least one component in each of the samples;
    automatically generating a statistical analysis using the computer based on the amounts of the at least one component in the samples and at least one of the variables identified in order to evaluate the reactions in the wells;
    automatically generating suggested parameters for future experiments using the computer wherein the suggested parameters are chosen from a new range of values based on the statistical analysis in order to optimize chemical synthesis, the new range of values being different from the range of values;
    dispensing reagents into the plurality of wells using the suggested parameters;
    reacting in the synthesizer the reagents using the suggested parameters;
    obtaining samples from the plurality of wells; and
    analyzing the samples using the analyzer to determine amounts of at least one component in each of the samples.

2. The method as claimed in claim 1 wherein the variables include operating conditions.

3. The method as claimed in claim 1 wherein the variables include reagent concentrations.

4. The method as claimed in claim 1 wherein one of the variables includes choice of solvents.

5. The method as claimed in claim 1 wherein one of the variables includes reaction time.

6. The method as claimed in claim 1 wherein one of the variables includes temperature of reaction.

7. The method as claimed in claim 1 wherein one of the variables includes type of reagents.

8. The method as claimed in claim 1 wherein one of the variables includes amount of reagents.

9. The method as claimed in claim 1 wherein the step of choosing a finite number of experimental tests includes randomly choosing values for the variables from the range of values.

10. The method as claimed in claim 1 wherein the step of analyzing the samples using the analyzer includes determining the amount of product yield.

11. The method as claimed in claim 1 wherein the step of analyzing the samples using the analyzer includes determining the amount of by-products.

12. The method as claimed in claim 1 wherein the step of analyzing the samples using the analyzer includes determining the amount of unreacted reagents.

13. The method as claimed in claim 1 wherein the step of automatically generating a statistical analysis includes ranking the plurality of wells based on the amounts of the at least one component the at least one variable.

14. The method as claimed in claim 1 wherein the step of automatically generating a statistical analysis includes determining a most favorable reaction in one of the plurality of wells based on the amounts of the at least one component and the at least one variable.

15. The method as claimed in claim 1 wherein the step of automatically generating a statistical analysis includes graphically describing the reactions in the plurality of wells based on the amounts of the at least one component and the at least one variable.

16. The method as claimed in claim 15 wherein graphically describing the reactions includes generating multivariable contour maps.

17. The method as claimed in claim 1 wherein the new range of values is narrower than the range of values.

18. A method for optimizing chemical synthesis using a synthesizer, an analyzer, and a computer, the method including the steps of:
    indentifying variables which affect chemical synthesis for a reaction;
    choosing a finite number of experimental tests, wherein the experimental tests have values for the variables, the values defining an experimental range;
    providing a plurality of wells;
    assigning each of the experimental tests to a particular well;

synthesizing samples in the synthesizer using the values in the experimental tests;

obtaining at least portions of the samples from the plurality of wells;

analyzing the portions of the samples using the analyzer to determine amounts of at least one component in each of the samples;

automatically generating a statistical analysis using the computer based on the amounts of the at least one component in the samples and at least one of the variables indentified in order to evaluate the reactions in the wells; and automatically generating, using the computer, suggested parameters for future experiments based on the statistical analysis, the suggested parameters defining a suggested parameter range, the suggested parameter range being different from the experimental range.

19. The method as claimed in claim 18 wherein the variables include operating conditions and reagent concentrations.

20. The method as claimed in claim 19 wherein the variables further include reaction times.

21. The method as claimed in claim 18 further comprising the step of determining a range of values of the variables.

22. The method as claimed in claim 21 wherein the values for the experimental tests are chosen from the range of values.

23. The method as claimed in claim 22 wherein the values for the experimental tests are chosen randomly from the range of values.

24. The method as claimed in claim 22 wherein the suggested parameters are chosen from a new range of values, the new range of values being narrower than the range of values.

25. The method as claimed in claim 18 wherein the step of analyzing the portions of the samples using the analyzer includes determining the amount of product yield.

26. The method as claimed in claim 18 wherein the step of analyzing the portions of the samples using the analyzer includes determining the amount of by-products.

27. The method as claimed in claim 18 wherein the step of analyzing the portions of the samples using the analyzer includes determining the amount of unreacted reagents.

28. The method as claimed in claim 18 wherein the step of automatically generating a statistical analysis includes determining a most favorable reaction in one of the plurality of wells based on the amounts of the at least one component and the at least one variable.

29. The method as claimed in claim 18 wherein the step of automatically generating a statistical analysis includes graphically describing the reactions in the plurality of wells based on the amounts of the at least one component and the at least one variable.

30. The method as claimed in claim 29 wherein graphically describing the reactions includes generating multivariable contour maps.

31. An apparatus for optimizing chemical synthesis comprising:

a computer including a memory and a processor;

a synthesizer in communication with the computer, the synthesizer having a plurality of wells, the synthesizer also having devices to control the atmospheric conditions of reactions in the plurality of wells;

an analyzer in communication with the computer, the analyzer analyzing amounts of a least one component of the reactions;

means for obtaining samples from the plurality of wells and transferring the samples to the analyzer;

the apparatus configured to perform the steps of:
synthesizing samples in the wells of the synthesizer based on experimental tests, the experimental tests having values for variables which affect chemical synthesis, the values defining an experimental range;

obtaining at least portions of the samples using the analyzer to determine amounts of at least one component in each of the samples;

automatically generating a statistical analysis using the computer based on the amounts of the at least one component in the samples and at least one of the variables identified in order to evaluate the reactions in the wells; and automatically generating, using the computer, suggested parameters for future experiments based on the statistical analysis, the suggested parameters defining a suggested parameter range, the suggested parameter range being different from the experimental range.

32. The apparatus of claim 31 wherein the means for obtaining samples includes a robot.

33. The apparatus of claim 31 wherein the apparatus is further configured to perform the step of choosing the experimental tests.

34. The apparatus of claim 33 wherein the apparatus randomly chooses the experimental tests.

35. The method as claimed in claim 31 wherein the apparatus analyzes the portions of the samples using the analyzer to determine the amount of product yield.

36. The method as claimed in claim 31 wherein the apparatus analyzes the portions of the samples using the analyzer to determine the amount of by-products.

37. The method as claimed in claim 31 wherein the apparatus analyzes the portions of the samples using the analyzer to determine the amount of unreacted reagents.

* * * * *